(12) United States Patent
Schmidt et al.

(10) Patent No.: US 6,259,413 B1
(45) Date of Patent: Jul. 10, 2001

(54) ANTENNA ARRANGEMENT AND TRANSPONDER READER

(75) Inventors: Andreas Schmidt; Matthias Süb, both of Dresden (DE)

(73) Assignee: Moba-Mobile Automation GmbH, Elz (DE)

( * ) Notice: Subject to any disclaimer, the term of this patent is extended or adjusted under 35 U.S.C. 154(b) by 0 days.

(21) Appl. No.: 09/428,138

(22) Filed: Oct. 26, 1999

(30) Foreign Application Priority Data

Feb. 5, 1999 (DE) .................................................. 19904752

(51) Int. Cl.$^7$ .................................................. H01Q 11/12
(52) U.S. Cl. ............................................ 343/742; 343/867
(58) Field of Search .................................... 343/742, 741, 343/866, 867; 340/571, 572.7, 572.3; H01Q 11/12

(56) References Cited

U.S. PATENT DOCUMENTS

| 2,235,163 | 3/1941 | Peterson | 343/732 |
| 3,082,421 | * 3/1963 | Shyalla | 343/114 |
| 4,866,455 | * 9/1989 | Lichtblau | 343/742 |
| 5,373,301 | * 12/1994 | Bowers et al. | 343/742 |
| 5,825,291 | * 10/1998 | Platt et al. | 343/572 |
| 5,914,692 | * 6/1999 | Bowers et al. | 343/742 |
| 5,966,100 | * 10/1999 | Podger | 343/742 |

FOREIGN PATENT DOCUMENTS

| 384644 | 2/1965 | (CH) . | |
| 3324639C2 | 7/1983 | (DE) . | |
| 195 42 441 | 11/1995 | (DE) | H01Q/1/32 |
| 196 32 798 | 8/1996 | (DE) | H04B/1/59 |
| 197 17 505 | 4/1997 | (DE) | H04B/1/59 |
| 893577 | 4/1943 | (FR) . | |

OTHER PUBLICATIONS

Wuertz, H., *DX–Antennen mit spiegelnden Flachen*, 1981, DE–Z cq–DL.
Rothammel, K., *Antennenbuch*, 1984.
Capon, R., *You Can Build: A Complex Loop Antenna for 30 through 12 Meters*, May 1994, QST.

* cited by examiner

Primary Examiner—Hoanganh Le
Assistant Examiner—Trinh Vo Dinh
(74) Attorney, Agent, or Firm—Michael A. Glenn (57) ABSTRACT

An antenna arrangement, which is preferably incorporated in a transponder reader, comprises a first subloop, which essentially encloses a first area and which has a first and a second end, a second subloop, which essentially encloses a second area and which has a first and a second end, the two first ends of the first and the second subloop being connected together and the two second ends being connected together in such a way that the two subloops together constitute a single winding, and a single feeding device for applying a voltage between the connected first ends and the connected second ends, the first and the second subloop being so positioned relative to each other that the first and the second area are so arranged facing each other that plane areas approximating to the areas are parallel to each other or intersect one another at an acute angle. Since the inductance can be kept as small as possible for such an antenna arrangement, considerably larger pass-through cross-sections can be realized, or larger circuit capacitances can be employed so as to minimize the influence of stray capacitances. In this way stable antenna operation can be achieved in a reliable and economic way even at higher operating frequencies.

17 Claims, 4 Drawing Sheets

ANTENNA ARRANGEMENT AND TRANSPONDER READER

FIELD OF THE INVENTION

The present invention relates to antenna arrangements, and in particular to an antenna arrangement for a transponder read unit which enables certain identification of a transponder, and furthermore to a transponder reader which comprises such an antenna arrangement.

DESCRIPTION OF BACKGROUND ART

Transponders are transmitters/receivers which normally do not need their own energy supply. Transponders are addressed by an electromagnetic high-frequency field and obtain their operating energy through rectification of the high-frequency field. They are usually configured to perform a particular function in response to a particular receive signal. This function may e.g. be that they in turn transmit an identification code, that they write into an assigned memory, or that they transmit some other signal, which can in turn be received by a receiver and which provides the same with information on a particular property of the transponder.

In recent times very cheap transponders have appeared on the market, which can e.g. be incorporated into labels so as to identify an object which has the label positioned on or stuck to it. Distributing the mail is one application which may be thought of here. Although an address which a person can read is stuck onto parcels, the actual distribution can nevertheless be performed by means of a transponder housed in the label and which can be read by a suitable reading device. Such a label with an electronic transponder becomes superfluous when the parcel has been delivered and the label is more or less broken. Such transponders must be very cheap since they are one-use articles.

In the above mail distribution scenario a transponder affixed to a parcel can be initialized at the outset in order e.g. to indicate a special parcel by means of a serial number. Alternatively, the transponder could issue the destination address of the parcel in response to a certain query data sequence. Such a parcel will, if it is submitted at a post office, pass through several distribution centres on its way to the recipient. As an example of writing into the transponder, the transponder assigned to the parcel via the label could have a certain code written into it at each distribution centre so as to follow the path of the parcel. An example of writing into a transponder is, of course, also the initialization at the start, i.e. the original input of the destination address.

In a parcel distribution centre lots of parcels with transponders are transported on the conveyor belt. A reading device can activate the transponders of the individual parcels so as to determine their destination address in order to send them in the right direction from the main conveyor belt.

Such transponders are mainly used as identification systems. Inexpensive identification transponders of this kind, e.g. incorporated in labels, can be used wherever particular objects are to be identified automatically.

Some boundary conditions exist for the design of antenna arrangements for transponder read units. On the one hand an antenna arrangement must generate a sufficiently large field density so that the transponder can "draw" enough electrical energy from the antenna field. In addition, there are certain frequency bands which have been allocated for such radio systems. Finally, an important boundary condition for such antenna arrangements is that the dimensions e.g. of the conveyor belt or also of the objects equipped with transponders are rigidly fixed in advance and there is no possibility of modifying the objects or the conveyor equipment to match the antenna geometries; instead, the antenna geometries must be matched to existing conveyor belts and existing object sizes. To stay with the example of parcel distribution, it must be possible to process parcels even though they may be 90 cm high. The parcel size cannot be changed because of the antenna geometry, rather the antenna geometry must necessarily accommodate itself to the parcel size and also to existing conveyor belt equipment. Furthermore, the labels can quite generally be located anywhere on the parcel.

Figure 7:
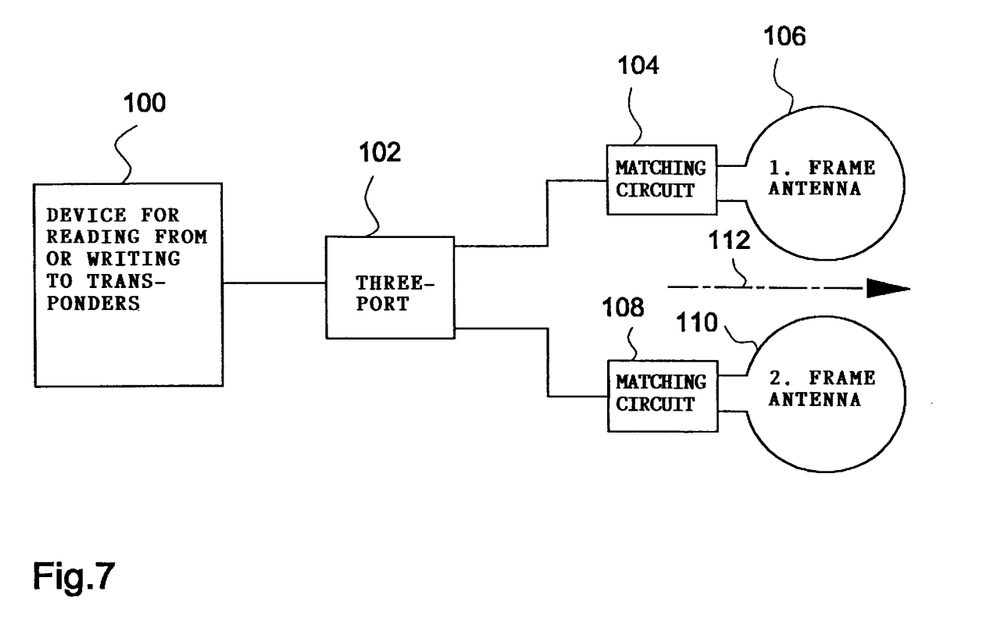
FIG. 7 shows an embodiment of a known transponder reader with two separate frame antennas and two matching networks.

FIG. 7 shows a known embodiment of an antenna arrangement, together with the circuitry, for reading out transponders on objects on a conveyor belt or for communicating with the same. The arrangement comprises a transponder read unit 100, which supplies electrical signals to be sent to the transponders and which receives the electrical signals from the transponders. This takes place via a three-port circuit 102, which has a first matching network 104 for a first frame antenna 106 connected to one of its two output ports and a second matching network 108 for a second frame antenna 110 connected to the other output port. In the known arrangement the two frame antennas 106 and 110 are arranged to the left and to the right of a conveyor direction 112, which is symbolized by a broken arrow in FIG. 7. In order that high and large parcels can be used in the arrangement shown in FIG. 7, the two individual frame antennas must have considerable dimensions.

Furthermore, it must be taken into account that the geometry of the conveyor belt, which is shown symbolically by the directional arrow 112, is also fixed in advance and can also assume considerable proportions. In order that transponders in the middle of the conveyor belt can also be read out, the antenna must be supplied with sufficient energy. In particular, the field strength must be restricted to a permissible maximum, which is specified by national authorities of the country in which the system is operated.

Furthermore, it is necessary that the two matching networks 104 and 108 are closely matched to one another in order that the transponder signals can be received correctly and can be evaluated without substantial error by the transponder read unit 100.

The following is a common approximation formula for the inductance of a frame antenna which should be valid for the frame antennas 106 and 110.

$$L = 2 \cdot u \cdot (\ln(u/D) - Kq) \cdot (N)^{1.8}$$

The individual parameters in this equation have the following significance:

- u Circumference of the antenna loop [cm]
- D Width or diameter of the conductor [cm]
- Kq Correction factor which takes account of the shape of the antenna (Kq=1.47 for square antennas, Kq=1.07 for circular antennas)
- N Number of turns
- L Antenna inductance [nH]

The resonant frequency is given by the following equation:

$$f = 1/(2 \cdot \pi \cdot \sqrt{C \cdot L})$$

An increase in the circumference of a frame antenna leads, as can be seen from the equation for the antenna inductance, to an increase in the inductance. Because of the logarithmic function, however, the rise in the inductance can only be partially counteracted by increasing the width of the conductor. Furthermore, increasing the number of turns also leads to an increase in the inductance.

A high inductance is not desirable for stable antenna operation, however, if the frame antennas are to be operated at frequencies above 10 MHz. From the equation for the resonant frequency it becomes clear that for very large antennas the antenna capacitance becomes very small, typically less than 100 pF, in order to achieve the required operating frequency. Since stray capacitances and the self-capacitance of the inductance can already reach this value, however, a stable configuration and tuning of such a resonant circuit is no longer possible. In the case of transponder read units in particular, the stray capacitances present a considerable problem since, on the one hand the antennas must be large and on the other hand a multitude of continuously varying stray capacitances exist in a mail distribution centre next to a conveyor belt, on the one hand due to objects of different sizes and on the other hand due to the continuously varying environment. To become independent of the stray capacitances the antenna must be loaded with a capacitance which is considerably higher than the stray capacitances in such a way that variable stray capacitances only have negligible effects on the antenna operation. However, if the inductance of the antenna were already very large, it would no longer be possible to connect a very large capacitance to the antenna to achieve a particular operating frequency in the range between 10 and 20 MHz. Thus the requirement exists that the inductance of the antenna should be kept as small as possible so that a precisely defined capacitance of the highest possible value can be included in the antenna circuit.

In addition, such antenna arrangements should not be too costly and be simple to operate so that people who are not accredited specialists can also operate such an installation and even carry out minor tuning operations.

SUMMARY OF THE INVENTION

It is the object of the present invention to provide an economic antenna arrangement which enables stable operation even at high frequencies.

In accordance with a first aspect of the present invention, this object is achieved by an antenna arrangement comprising: a first subloop, which essentially encloses a first area and which has a first and a second end; a second subloop, which essentially encloses a second area and which has a first and a second end, where the two first ends of the first and the second subloop are connected together, and where the second ends of the first and the second subloop are connected together, in such a way that the two subloops together constitute a single closed winding; a single feeding device for applying a voltage between the connected first ends and the connected second ends, where the first and the second subloop are so positioned relative to each other that the first and the second area are arranged facing each other and a plane area approximating to the first area and a plane area approximating to the second area are parallel to each other or intersect at an acute angle.

An additional object of the present invention is to provide a transponder reader which enables reliable communication with transponders.

In accordance with a second aspect of the present invention, this object is achieved by means of a transponder reader comprising: a read zone; equipment for transporting an object, to which a transponder is affixed, into the read zone; an antenna arrangement according to the first aspect of the present invention, which is arranged in the read zone in such a way that the transponder can be read out by means of the antenna arrangement.

The present invention is based on the finding that the use of two frame antennas, each having only one winding so as to keep their inductances as small as possible, but which taken together in fact constitute two windings in the case of the appropriate access circuitry required for transponder systems, must be avoided in order to obtain a sufficiently large antenna which can be operated reliably, despite its size, at the required operating frequencies. In contrast to the prior art, a single closed antenna winding is used and arranged in the form of a "folded eight" in such a way that a first subloop (the upper "circle" of the number 8) and a second subloop (the lower "circle" of the number 8) result, which are not however arranged in a single plane but in respective planes which intersect at an acute angle or are parallel to one another. The feeding of the antenna arrangement according to the present invention takes place in the centre, i.e. at the "node" of the "eight", resulting in parallel-connection of the two subloops, which, however, together constitute just a single winding. Identical feeding of the two subloops is thus automatically achieved in such a way that only one matching network is required since the two subloops are automatically tuned to each other. By means of the arrangement according to the present invention, which comprises only a single winding from which the two subloops are formed, the inductance of the whole antenna arrangement can be kept as small as possible. This means that considerably bigger loop cross-sections can be achieved.

In a preferred embodiment of the present invention the single winding is also crossed over between the upper subloop and the lower subloop in such a way that the current flow directions in the two subloops, which are arranged in two superposed planes, are in opposite senses, which leads to opposed orientation of the fields created by the two subloops, whereby a magnetic field which is as inhomogeneous as possible surrounds the antenna in such a way that transponders can be identified almost regardless of their orientation.

Alternatively, however, the cross-over can be dispensed with, in which case the current flow direction is in the same sense in the two subloops. As a consequence the field is more homogeneous than when the current flow directions are in opposite senses, but this can be compensated for by suitable inclination of the antenna equipment relative to the transport equipment.

It should be pointed out here that fundamentally any rotation of the antenna arrangement about the three axes is possible relative to the transport equipment. Equally it is possible to twist the two subloops relative to one another about all three axes provided the subloops face each other and the approximated plane areas are parallel to each other or intersect at an acute angle.

It can be established qualitatively that good communication between a transmitting antenna and a receiving antenna is possible when the field lines generated by the two antennas are substantially parallel to one another. On the other hand, there will be poor communication or no communication at all between a transmitting and a receiving antenna if the field lines generated by the two antennas are at right angles to each other. Although the objects to be identified, which are equipped with transponders, are to a certain extent preoriented in certain circumstances, it must nevertheless be guaranteed that transponders with arbitrary orientation can be read, which can only be achieved if the antenna field in which the transponder finds itself is as inhomogeneous as possible or if the transponders are moved along a particular path, i.e. in a read zone, along which there is a pronounced spatial variation in the field of the antenna arrangement.

Since, in contrast to a simple frame antenna, the circumference of a subloop in the antenna arrangement according to the present invention can be made considerably larger without having such a pronounced effect on the inductance, it is possible not only to move objects between and past the two subloops but also to move them through the subloops themselves. In this way the transponders are brought into close proximity with the antenna. This means that the read distances are smaller than for the known antenna of FIG. 7, which is also called a "gate antenna" in expert circles. A preferred embodiment of the present invention thus supports low-range systems, i.e. systems with lower transmission powers both of the antenna and also, which is perhaps even more important, of the transponder itself, since this does not have its own energy supply but must extract the transmission energy from the HF field of the antenna arrangement.

A further special advantage of the present invention is that just through the geometrical arrangement of the two subloops relative to each other, or to the read zone, field zeros can be so manipulated that in the read zone there are effectively no "dead" areas, i.e. areas where there are no magnetic fields, it being particularly important to note that this holds true for all transponder orientations relative to the antennas or the read zone.

BRIEF DESCRIPTION OF THE DRAWINGS

Preferred embodiments of the present invention will be described in detail below, making reference to the enclosed drawings in which.

DETAILED DESCRIPTION OF PREFERRED EMBODIMENTS

Figure 1:
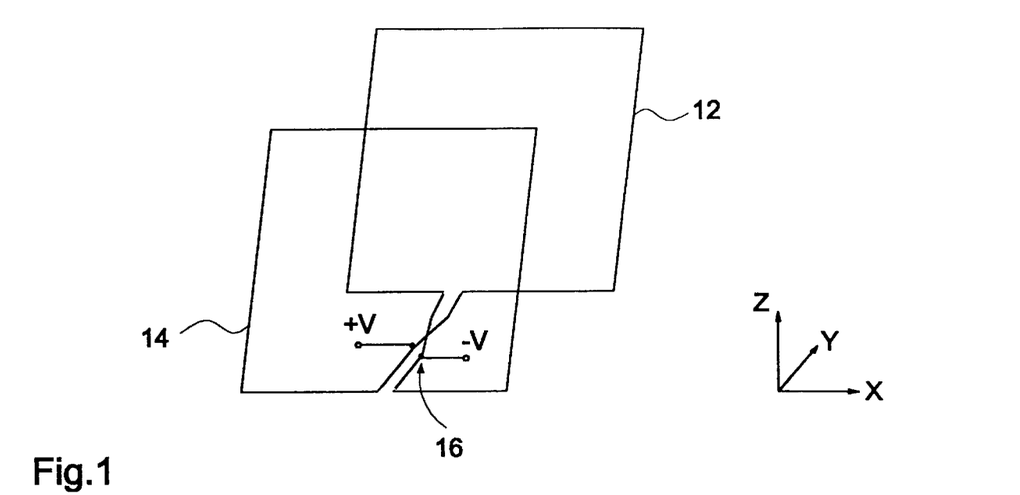
FIG. 1 shows an antenna arrangement according to the present invention according to a preferred embodiment of the present invention.

FIG. 1 shows a schematic perspective representation of an antenna arrangement according to the present invention according to a preferred embodiment of the present invention. The antenna arrangement comprises a first subloop 12, a second subloop 14 and a single feeeding device 16. The reference coordinate system is indicated at the right of FIG. 1. From this it is clear that in the representation shown here the first subloop 12 lies in the xz-plane at a first y-coordinate. Similarly, the second subloop 14 is also located in an xz-plane but at a different y-coordinate than the first plane, i.e. the first subloop 12. It can also be seen from FIG. 1 that the two planes in which the two subloops lie are substantially parallel to each other. This simply represents one preferred embodiment, however. The two subloops can be so tilted relative to the yz-plane that the two planes defined by the two subloops 12 and 14 intersect at an acute angle. An arrangement in which the two subloops 12 and 14 lie in the same plane, i.e. a non-folded eight, fails to provide the advantage according to the present invention, however, since the two loops, which are not arranged facing each other, do not define an imaginary volume through which transponders to be identified can be moved, or into which transponders to be identified can be brought. For an antenna in the form of a non-folded standing eight this is not the case.

From the above it also becomes clear, however, that the two subloops need not just be planar rectangles or planar circular frames but can also define convex and/or concave areas of arbitrary form. The first subloop and the second subloop must simply be positioned relative to each other in such a way that planar areas which approximate to arbitrary convex or concave areas defined by the first and the second subloops are parallel to each other or intersect at an acute angle. Only in this way is an imaginary volume through which transponders to be identified can be moved, or into which transponders to be identified can be brought, defined between the two arbitrarily shaped subloops 12, 14, which are arbitrarily arranged facing each other.

In FIG. 1 it can also be seen that by crossing over the conductors in the neighbourhood of the feeding point the two subloops 12, 14 are so fed that the current flow directions in the two subloops 12, 14 are in opposite senses. In this way a particularly high degree of inhomogeneity is created in an advantageous manner between the two subloops 12, 14, i.e. in the imaginary volume. Alternatively, however, there might not be a crossover and the situation such that the current flow direction is in the same sense in the two subloops 12, 14, which are fed through a single point. Here, too, the advantage according to the present invention is achieved since the area which is enclosed by the subloops 12, 14 can be increased without the inductance of the antenna arrangement increasing as strongly as when an analogous antenna arrangement with a single frame antenna is appropriately dimensioned so as to enclose the same area. This means that the inductance of the antenna arrangement can be kept within bounds, with the result that relatively large circuit capacities can be utilized so as to achieve antenna operation which is substantially unaffected by stray capacities.

The antenna arrangement is operable in the frequency range between 12 and 14 MHz, wherein the two areas which are essentially enclosed by the two sub-loops lay between 0.8 and 1.2 square metres and wherein the inductance of the antenna arrangement is much smaller than the inductance of an antenna arrangement with two windings, each of which encloses the same area.

Figure 2A:
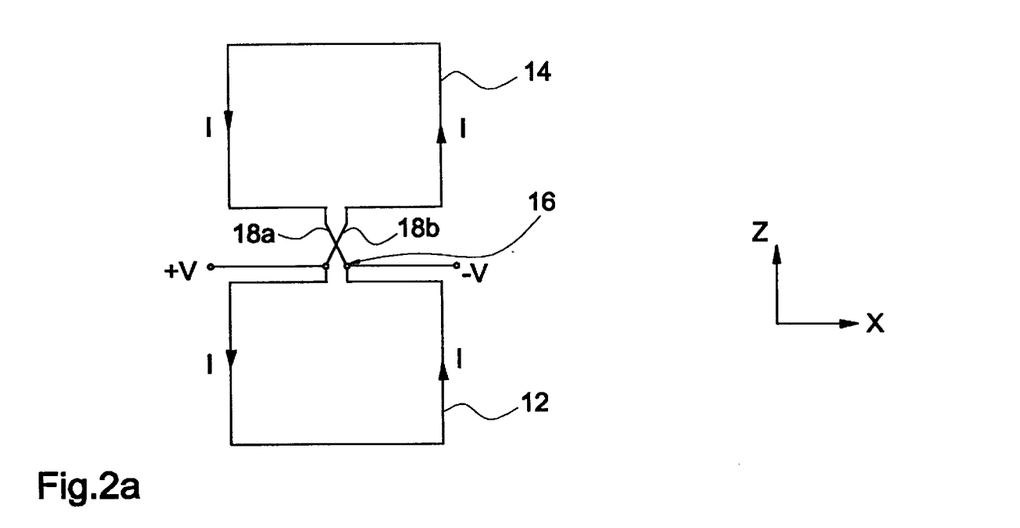
FIG. 2a shows an "unfolded" representation of the antenna arrangement of FIG. 1.

FIG. 2a shows an unfolded representation of the antenna arrangement of FIG. 1. Also, the current flow directions, i.e. the arrows marked with I, are indicated in the two subloops 12, 14. As in FIG. 1, FIG. 2a shows the situation where the current flow directions in the two facing subloops are in opposite senses, this being achieved by crossing over the conductor sections 18a and 18b in the feeding zone between the two subloops. Alternatively, however, a crossover could be dispensed with, which in pictorial terms is achieved e.g. when the upper subloop 14 is rotated by 180 degrees about the z-axis. If the crossover is dispensed with, the current flow direction in the two subloops is in the same sense. From FIGS. 1 and 2a it is apparent that the two subloops 12, 14 and the two conductor sections 18a, 18b together form a single winding which is so formed that the two subloops 12, 14 result, the two subloops—which are themselves formed analogously to a frame antenna in such a way that they effectively, i.e. apart from the region in the neighbourhood of the first and second ends which is the feeding zone, enclose an area—being fed by the single feeding device 16.

Figure 2B:
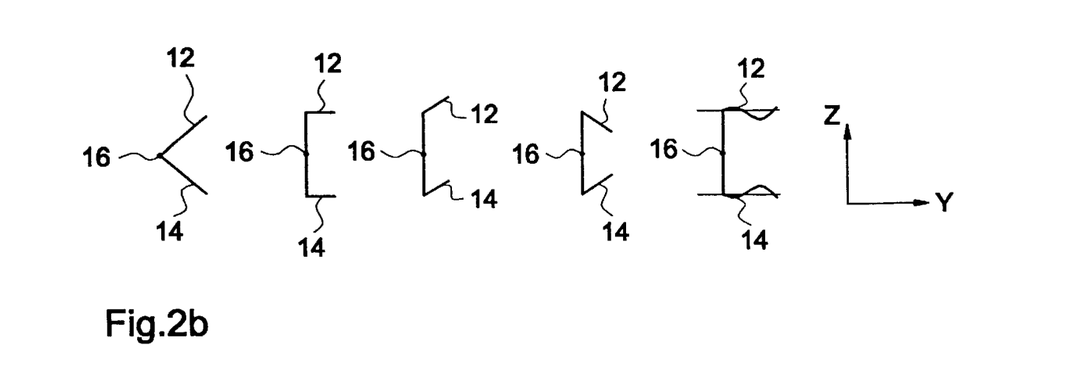
FIG. 2b shows a schematic side view of various antenna arrangements according to the present invention.

FIG. 2b shows in schematic form possible side views of an antenna arrangement according to the present invention. As is shown to the right of FIG. 2b, this is a view into the yz-plane. At the far left of FIG. 2b a general antenna arrangement with the first and second subloops 12, 14 and a feeding device 16 is shown in which the conductors 18a, 18b (FIG. 2a) are missing. FIG. 2b shows the side view of the antenna arrangement shown in FIG. 1. The third view from the left shows a modified arrangement of the antenna arrangement shown in FIG. 1 in which the two areas which are defined by the subloops 12, 14 are parallel to each other but are not arranged perpendicular to the conductor sections 18a, 18b (FIG. 2b). The second drawing from the right in FIG. 2b shows yet another configuration in which the two areas which are defined by the subloops can be imagined to intersect at an acute angle and also form an acute angle with the conductor sections 18a, 18b. The drawing at the far right in FIG. 2b is meant to symbolize that the two subloops 12, 14 do not have to enclose plane areas but that the areas which are enclosed by the subloops 12, 14 may be arbitrarily convex and/or concave; furthermore, the areas which are enclosed by the two subloops 12, 14 may also differ from one another. In this case it can be said that two plane areas which approximate to the areas enclosed by the subloops and which are marked by broken lines in the drawing at the far right in FIG. 2b must be parallel to each other or must intersect at an acute angle in order to achieve the advantage according to the present invention of limited increase in inductance with increasing dimensions.

From the individual drawings of FIG. 2b it is plain that the two subloops 12, 14 are arranged facing each other in such a way that an imaginary volume as it were results between the same in which the fields of the two subloops which are created when the two subloops are fed interact with each other. From FIG. 2b it is also apparent that the closer the two facing subloops 12, 14 are to each other the stronger is the magnetic field between the subloops if the same feeding power is supplied. As will be described later, a flexible solution for transponder read units with a conveyor belt in continuous motion can, however, be provided through the feeding power on the one hand and the separation of the subloops 12, 14, if the antenna shown in FIG. 1 is considered, on the other. The feeding power and the separation of the subloops can be matched to every possible belt speed. When it is further taken into account that the transponders normally respond according to a particular signalling protocol, which requires a certain time to be transmitted, and that it is necessary to ensure that the transponder is in the read zone of the antenna arrangement while it transmits its response signal, it is particularly advantageous that the separation of the two subloops and the belt speed can be optimally matched to each other.

From FIGS. 1 and 2a it is furthermore clear that the antenna arrangement is preferably fed symmetrically. This preferably occurs by means of a balun, which has an unsymmetrical HF input, which normally has an impedance of 50 Ω, and two symmetric outputs (+V and −V), which are connected to the feeding device of the antenna arrangement, i.e. to the feeding terminals, preferably in the middle of the single winding from which the antenna arrangement according to the present invention is formed.

Figure 3:
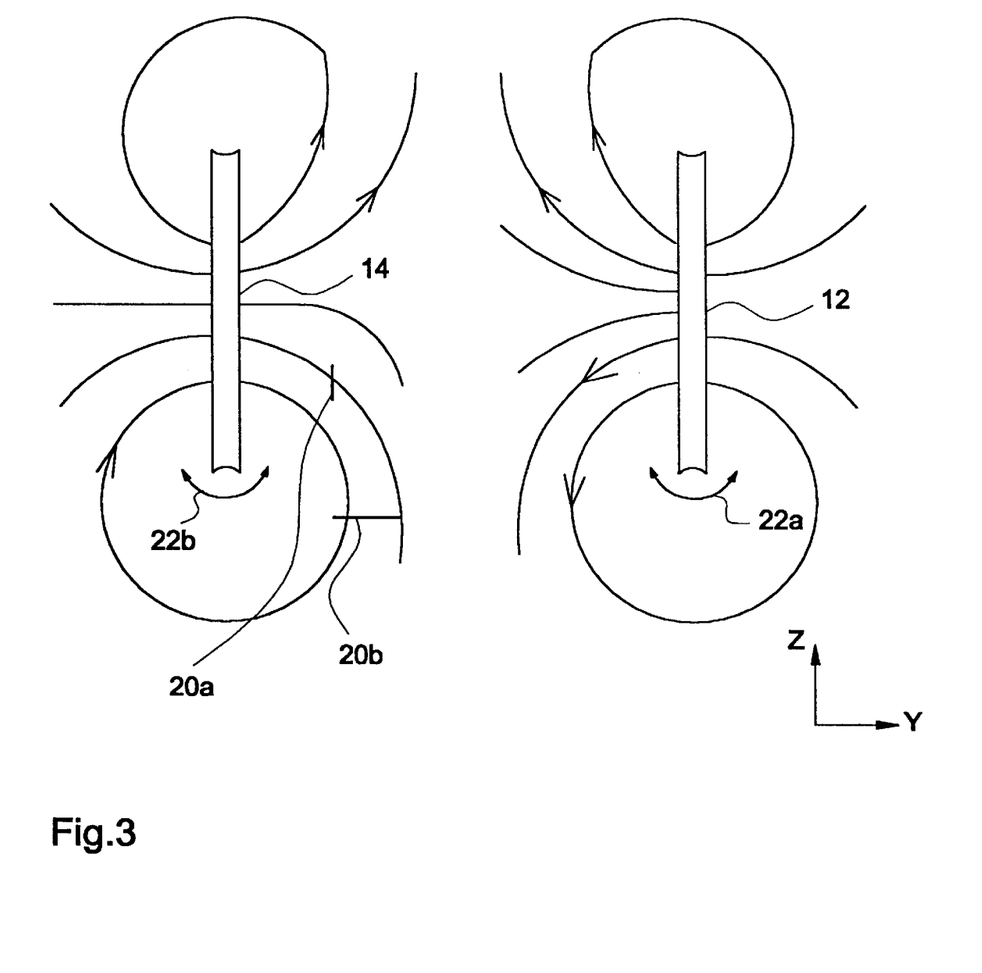
FIG. 3 shows a schematic diagram of the field distribution of the antenna arrangement shown in FIG. 1, to clarify the identification of transponders with different orientations.

FIG. 3 shows a view of the antenna arrangement according to the present invention in its preferred embodiment shown in FIG. 1, with parallel facing subloops 12, 14 which are in addition fed in opposite senses, this being achieved by the crossover of the conductor sections 18a, 18b (FIG. 2a). FIG. 3 also shows a first transponder 20a and a second transponder 20b which are moved parallel to the z-direction between and past the two subloops 12, 14. The two transponders 20a and 20b have different orientations, the first transponder 20a being oriented parallel to the z-direction whereas the second transponder 20b is oriented parallel to the y-direction. Because of the strongly inhomogeneous field between the two subloops 12, 14 the transponders with the two orientations can be identified properly. In particular, as is known to persons skilled in the art, transponders can be properly identified when imaginary field lines of a transponder and imaginary field lines of the antenna arrangement are essentially parallel to each other. In this case a good transformerlike coupling is guaranteed. Poor transponder identification results when the field lines of transponder and antenna arrangement "meet each other" essentially at right angles. Here there is practically no influence. A transponder which is so positioned will not therefore be able to be identified properly. To be able to deal with arbitrary transponder orientations relative to the antenna arrangement it is therefore important that the fields are strongly inhomogeneous.

Although FIG. 3 shows a situation in which the transponders are moved between and past the two subloops 12, 14, according to another embodiment of the present invention the preferred method is not to guide the transponders 20a, 20b between and past the subloops 12, 14 but to let them "dive through" the subloops 12, 14 themselves, i.e. to move them in the y-direction. The representation in FIG. 3 concerning the identifiability of the transponders 20a, 20b, which have different orientations relative to the antenna arrangement, is applicable by analogy to transponders moving in the y-direction, which pass through the areas enclosed by the subloops 12, 14, since the field representation shown in FIG. 3 is doubly axis-symmetric relative to the z-axis and the y-axis.

This double axis-symmetry is, however, problematic in that a zero spot of the magnetic field arises where the two symmetry axes meet. It is also clear from FIG. 3 that this zero spot lies approximately in the middle of the read zone, which means that it is disadvantageous in the case of an application where many transponders might find themselves there. An example of an application in which this zero spot plays no role would be in the case of parallelepiped-shaped parcels which have two long and two short sides when seen in cross-section and which are so constituted that transponders are only affixed to the short sides of the parcels. In this case, the geometry of the parcels is of itself sufficient to ensure that no transponders find themselves in the middle of the read zone, meaning that the zero field spot located there plays no role.

If it is intended to read out transponders in the middle between the two subloops 12, 14 as well, however, the field can be varied, e.g by "rotating" the individual subloops about the upper end point of the same, as indicated by the two arrows 22a and 22b. Such views as those shown in FIG. 2b could thereby be created. In this way the zero spot in the middle of the read zone can be moved outside the same or shifted to a boundary of the same, where it no longer plays a role. From this it is clear that the antenna arrangement according to the present invention with two subloops arranged facing each other provides ample freedom of design to enable the antenna field to be tuned to the special application in hand.

Figure 4:
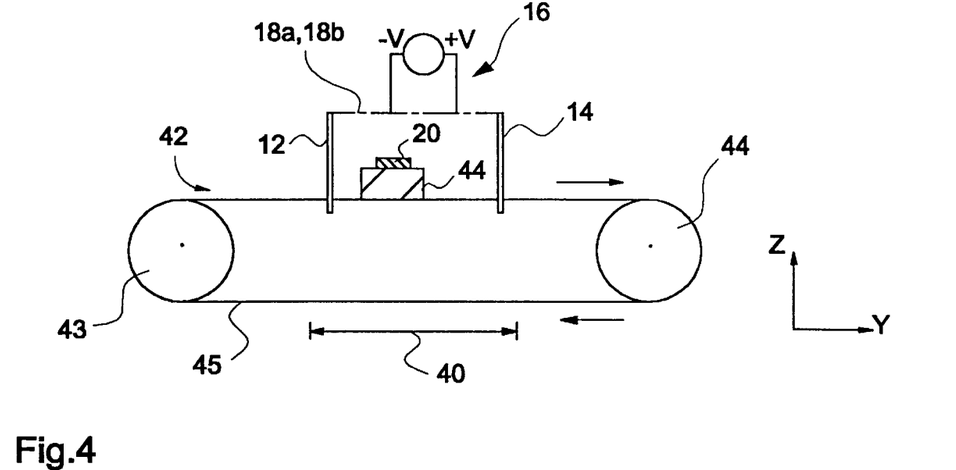
FIG. 4 shows a transponder reader according to the present invention with an antenna arrangement according to the present invention in a particular orientation with respect to the read zone.
Figure 5:
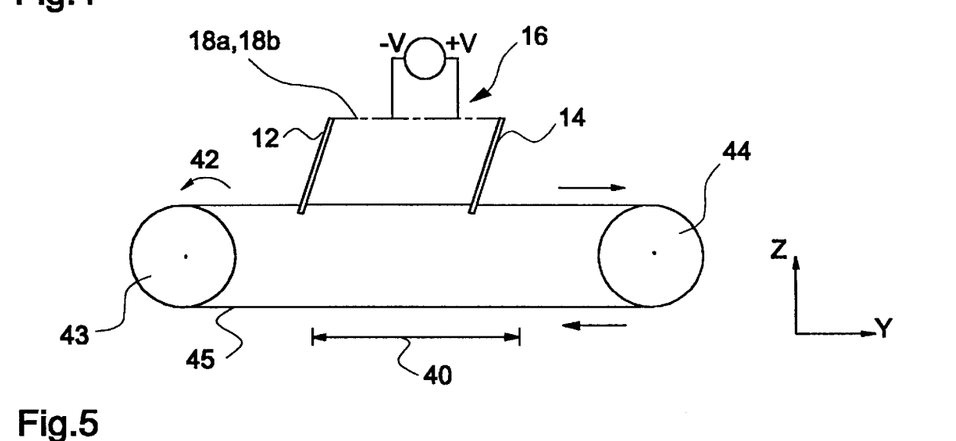
FIG. 5 shows a transponder reader according to the present invention with a different orientation of the antenna arrangement with respect to the read zone.
Figure 6:
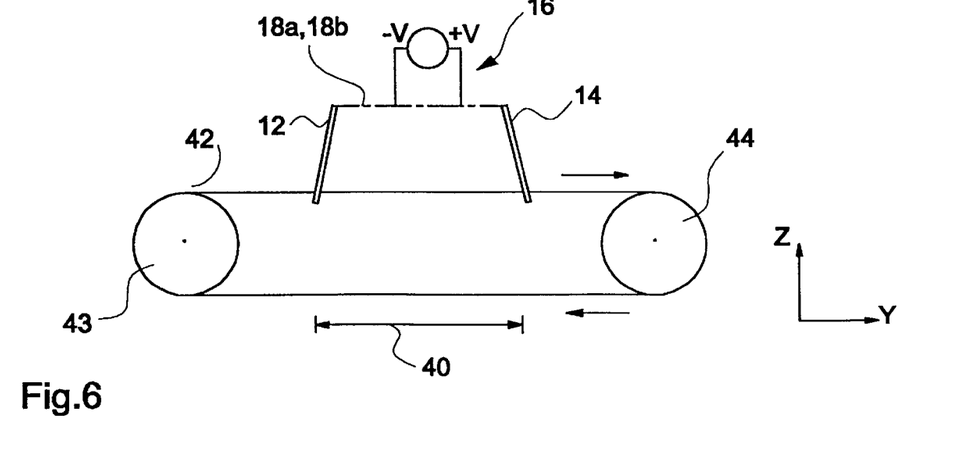
FIG. 6 shows a transponder reader according to the present invention with an alternative orientation of the antenna arrangement according to the present invention with respect to the read zone.

FIGS. 4 to 6 each show a transponder reader, comprising a read zone 40, equipment 42 for transporting an object 44, to which a transponder 20 is affixed, into the read zone 40, as well as the antenna arrangement according to the present invention, which has been described in connection with FIGS. 1, 2a, 2b and 3. The antenna arrangement is so arranged relative to the read zone 40 that the transponder 20 can be read out by means of the antenna arrangement. As has already been explained, the antenna arrangement comprises the first subloop 12, the second subloop 14, in the preferred embodiment shown in FIG. 4 first and second conductor sections 18a, 18b, represented schematically by a broken line, which connect the antenna subloops 12, 14, as well as the single feeding device 16. In a preferred embodiment the transport equipment is designed as a continuous mechanism, which usually comprises a drive pulley 43, an idling pulley 46 and a conveyor belt 45. FIGS. 5 and 6 show alternative positionings of the antenna arrangement, or rather of the subloops 12, 14 relative to the read zone 40, designed e.g. to move the zero spot, which has been described in connection with FIG. 3, to a different position in the read zone, where it ceases to be a problem, or out of the read zone 40 altogether.

It should be pointed out here that the subloops can be rotated not only about the x-axis but about all three axes so as to move field zero spots out of the read zone or to change the field direction as necessary so as to achieve reliable transponder identification.

From FIGS. 4 to 6 it is clear that the feeding device 16 is positioned as far as possible from the transport equipment 42, which normally has a plurality of metallic components. This enables the stray capacitances, which could lead to unstable operation of the antenna, to be reduced further since a voltage feeding arrangement is used which is such that the maximum voltage occurs at the feeding point whereas the minimum voltage is present in the area of the subloops 12, 14 which lies opposite the feeding point. As a result the feeding area is considerably more susceptible to induced voltages, and thus stray capacitances, than the area of the antenna arrangement, where the minimum voltage dominates. Thus an important design criterion for transponder readers takes the form that the "hot" end of the antenna arrangement should be positioned as far as possible from metallic components whereas the "cold" end may be located near metallic components without stray capacitances having much effect.

In conclusion the important advantages of the antenna arrangement according to the present invention will be summarized once more. First, an important point is that only a single antenna winding and thus only a single antenna exists, which means that only one matching network is needed and accordingly also only a single tuning position without further effects. This results in an arrangement which is simple and inexpensive and which can, moreover, be tuned relatively easily even by non-specialists. The simple tuning work can also be performed automatically. Thanks to the simple tuning algorithm, the tuning can also be performed quickly, meaning that dynamic tuning during read unit operation is also possible. The tuning of two separate antennas according to the prior art, on the other hand, is cumbersome and consequently slow, meaning that dynamic tuning can only be achieved with great difficulty, if at all, with such antennas.

Furthermore, the form of the antenna according to the present invention in all its possible embodiments, of which only a few are shown in FIG. 2b, leads to a reduction in the coil inductance. Whereas the coil inductance is primarily determined by the area defined by the frame, the resonance capacitance is made up of the concentrated circuit capacitance provided for the purpose and the stray capacitance of the environment. This means that, to minimize the effect of the stray capacitances, the circuit capacitance can, for the same resonant frequency, i.e. an operating frequency for the antenna arrangement which lies between 12 and 14 MHz and is preferably 13.56 MHz, be chosen to be as large as possible. The "parallel circuiting" (midpoint feeding) of the two subloops results in the smallest inductance for a given antenna size.

A tuning device for tuning the resonant frequency of the antenna arrangement has a tunable capacitive component which has a considerably higher capacitance than stray capacitancies between the antenna arrangement and the environment in which the antenna is located.

The chosen means of connecting the two conductor strips (either direct or crossed-over) leads to the formation of a magnetic field between the two conductor loops which has the same direction in each loop, or which has opposite directions in the loops. It is thereby ensured that a transponder in all orientational directions is read.

As a consequence of the preferred "diving through" of the transponders through the loops for a preferred embodiment of the present invention the same find themselves in the neighbourhood of the antenna, i.e. the read distances are smaller than for a comparable gate antenna with two lateral frame antennas such as is shown in FIG. 7. Thus systems with smaller ranges, and thus also smaller transmitting powers, both as regards the antenna and the transponders, are supported. As a result of the preferentially conceived inclination of the two subloops, transponders which are oriented randomly in a plane can be read reliably. If, in addition, the opposed field orientation is chosen, as is shown for the antenna arrangement in FIG. 1, the third orientational direction of transponders, i.e. an alignment perpendicular to the transport direction, can also be processed reliably.

A further important advantage of the antenna arrangement according to the present invention is that the geometry of the same can be adapted to existing dimensions of objects to be identified, such as e.g. standardized mail parcels. The separation of the two subloops 12, 14 in the preferred embodiment shown in FIG. 1 depends on the speed of movement and on the length of the transponder communication protocol and can be varied within wide limits.

The end product is a reliable, moderately priced and flexible antenna arrangement which, in conjunction with a transponder reader, can be employed very advantageously.

What is claimed is:

1. A transponder reader comprising:
   an antenna arrangement including:
   a first subloop, which essentially encloses a first area and which has a first and a second end;
   a second subloop, which essentially encloses a second area and which has a first and a second end, where the two first ends of the first and the second subloops are connected together, and where the second ends of the first and the second subloops are connected together, wherein the two subloops together constitute a single closed winding;

a single feeding device for applying a voltage between the connected first ends and the connected second ends, where the first and the second subloops are so positioned relative to each other that the first and the second areas are arranged facing each other and a plane area approximating to the first area and a plane area approximating to the second area are either parallel to each other or intersect at an acute angle;

a read zone formed in proximity to said first subloop and said second subloop, wherein the read zone comprises a volume formed between the first and the second areas which are arranged facing each other;

equipment for transporting an object, to which a transponder is affixed, through the read zone, for reading out the transponder by means of the antenna arrangement.

2. The transponder reader according to claim 1, wherein the read zone features a longitudinal space which extends along a read zone axis, and wherein the first and the second subloops each essentially surrounds the longitudinal space and are spaced apart relative to the read zone axis, wherein the first and the second areas are selected such that the object to which the transponder is affixed can be passed through the first and the second subloops.

3. The transponder reader according to claim 1, wherein the first and the second subloops are arranged to the left and to the right of the read zone respectively, wherein a distance between the first and the second subloops is formed such that an object can be transported between the subloops, and wherein the first and the second areas are selected such that an object cannot be transported through one of the subloops.

4. The transponder reader according to claim 1, wherein, moreover, the transport equipment is arranged so as to move the object through the read zone continuously.

5. The transponder reader according to claim 1, wherein the first and the second area are parallel to each other but intersect a longitudinal read zone at an acute angle.

6. The transponder reader according to claim 1, wherein the first and the second area define an acute angle and intersect a longitudinal read zone at different angles.

7. The transponder reader according to claim 1, wherein the transport equipment is implemented as a flat conveyor belt which has metallic components.

8. The transponder reader according to claim 1, wherein the antenna arrangement is so arranged relative to the transport equipment that the first and the second ends, which are connected to the feeding device, are located as far as possible from the transport equipment so as to minimize leakage currents via stray capacitances.

9. The transponder reader according to claim 1, wherein the first area and the second area of said antenna arrangement are plane areas and where the approximated plane areas are identical to the areas enclosed by the first subloop and the second subloop.

10. The transponder reader according to claim 1, wherein the first and the second subloops of said antenna arrangement are so positioned relative to each other that the current flow direction in the first subloop is in the same sense as the current flow direction in the second subloop.

11. The transponder reader according to claim 1, wherein the first and the second subloops of said antenna arrangement are so positioned relative to each other that a current flow direction in the first subloop is in the opposite sense to a current flow direction in the second subloop.

12. The transponder reader according to claim 11, wherein the first and the second areas are essentially parallel to each other, wherein the first subloop and the second subloop take the form of nearly complete frames which are only open in that there is a certain separation between the first and the second ends, wherein the first and the second ends are connected together by means of a first and a second conductor respectively, wherein the first and the second conductors lie essentially perpendicular to the first and the second areas and, moreover, are crossed over, resulting in opposed current flow directions in the two subloops.

13. The transponder reader according to claim 1, wherein the first and the second subloops of said antenna arrangement essentially enclose areas which are rectangular in shape.

14. The transponder reader according to claim 1, wherein the feeding device of said antenna arrangement has a balun so as to feed the antenna arrangement summetrically.

15. The transponder reader according to claim 1, which also has a turning device for turning the resonant frequency of the antenna arrangement, the tuning device having a tunable capacitive component which as a considerably higher capacitance than stray capacitances between the antenna arrangement and the environment in which the antenna is located.

16. The transponder reader according to claim 1, wherein said antenna arrangement is operable in the frequency range between 12 and 14 Mhz, where the two areas which are essentially enclosed by the two subloops lie between 0.8 and 1.2 m$^2$ and where the inductance of the antenna arrangement is much smaller than the inductance of an antenna arrangement with two windings, each of which encloses the same area.

17. A transponder reader according to claim 10, wherein the antenna arrangement is so arranged relative to the transport equipment that the first and the second ends, which are connected to the feeding device, are located as far as possible from the transport equipment so as to minimize leakage currents via stray capacitances.

* * * * *